United States Patent
Iijima et al.

(10) Patent No.: US 7,567,505 B2
(45) Date of Patent: Jul. 28, 2009

(54) VRRP TECHNOLOGY KEEPING VR CONFIDENTIALITY

(75) Inventors: Tomoyuki Iijima, Kawasaki (JP); Masatoshi Takihiro, Yokohama (JP); Masayuki Hino, Yokohama (JP)

(73) Assignees: Hitachi, Ltd., Tokyo (JP); Hitachi Communication Technologies, Ltd., Tokyo (JP)

( * ) Notice: Subject to any disclaimer, the term of this patent is extended or adjusted under 35 U.S.C. 154(b) by 736 days.

(21) Appl. No.: 10/767,432

(22) Filed: Jan. 30, 2004

(65) Prior Publication Data

US 2005/0117598 A1  Jun. 2, 2005

(30) Foreign Application Priority Data

Dec. 1, 2003  (JP) .............................. 2003-401005

(51) Int. Cl.
*G01R 31/08* (2006.01)
*H04J 1/16* (2006.01)
*H04L 12/26* (2006.01)

(52) U.S. Cl. ...................... 370/216; 370/217; 370/218; 370/219; 370/220

(58) Field of Classification Search .......... 370/216–220
See application file for complete search history.

(56) References Cited

U.S. PATENT DOCUMENTS

| 5,473,599 | A | * | 12/1995 | Li et al. ....................... 370/219 |
| 6,424,659 | B2 | * | 7/2002 | Viswanadham et al. ..... 370/469 |
| 6,556,547 | B1 | * | 4/2003 | Srikanth et al. ............. 370/317 |
| 6,885,633 | B1 | * | 4/2005 | Mikkonen .................... 370/217 |
| 6,956,816 | B1 | * | 10/2005 | Alexander et al. .......... 370/222 |
| 7,092,354 | B2 | * | 8/2006 | Jensen ......................... 370/218 |
| 2005/0198381 | A1 | * | 9/2005 | Rorie ......................... 709/239 |

* cited by examiner

*Primary Examiner*—Ayaz R Sheikh
*Assistant Examiner*—Blanche Wong
(74) *Attorney, Agent, or Firm*—Reed Smith LLP; Juan Carlos A. Marquez, Esq.

(57) ABSTRACT

In a packet transmission router used in a VRRP (Virtual Router Redundancy Protocol) network having a VR (Virtual Router) function, when virtual routers VR are realized by the VRRP, the routing control information that each VR manages is prevented from being mixed with that of other VR. When an active packet transmission router transmits a VRRP packet to a standby packet transmission router, an identifier indicating which virtual router belongs to the VRRP packet is added to the VRRP packet before the transmission of the VRRP packet.

12 Claims, 12 Drawing Sheets

| VERSION | TYPE | VRRP IDENTIFIER (VRID) | PRIORITY | COUNT IP ADDRESS |
|---------|------|------------------------|----------|------------------|
| AUTHENTICATION TYPE | | ADVERTISEMENT INTERVAL | CHECKSUM | |
| IP ADDRESS (1) | | | | |
| IP ADDRESS (2) | | | | |
| AUTHENTICATION DATA (1) | | | | |
| AUTHENTICATION DATA (2) | | | | |

| DESTINATION NODE IP ADDRESS | SENDING INTERFACE |
|---|---|
| NODE 1 IP ADDRESS | INTERFACE 41 |
| NODE 3 IP ADDRESS | INTERFACE 42 |
| NODE 5 IP ADDRESS | INTERFACE 43 |
| NODE 7 IP ADDRESS | INTERFACE 44 |

ASSIGNED TO ISP1: NODE 1, NODE 3

ASSIGNED TO ISP2: INTERFACE 42, INTERFACE 43, INTERFACE 44

| VERSION | VR CONFIGURATION FLAG | VIRTUAL ROUTER IDENTIFIER | PRIORITY | COUNT IP ADDRESS |
|---|---|---|---|---|
| AUTHENTICATION TYPE | | ADVERTISEMENT INTERVAL | CHECKSUM | |
| IP ADDRESS (1) | | | | |
| IP ADDRESS (2) | | | | |
| AUTHENTICATION DATA (1) | | | | |
| AUTHENTICATION DATA (2) | | | | |

FIG. 10

| DATA LINK HEADER | IP HEADER | VRRP PACKET | CRC |
|---|---|---|---|

FIG. 11

| PREAMBLE | DESTINATION MAC ADDRESS | SOURCE MAC ADDRESS | TYPE |
|---|---|---|---|

FIG. 13

| DESTINATION NODE IP ADDRESS | SENDING INTERFACE |
|---|---|
| NODE 1 IP ADDRESS | INTERFACE 41 |
| NODE 2 IP ADDRESS | INTERFACE 41 |
| NODE 5 IP ADDRESS | INTERFACE 43 |
| NODE 6 IP ADDRESS | INTERFACE 43 |

FIG. 14

| DESTINATION NODE IP ADDRESS | SENDING INTERFACE |
|---|---|
| NODE 3 IP ADDRESS | INTERFACE 42 |
| NODE 4 IP ADDRESS | INTERFACE 42 |
| NODE 7 IP ADDRESS | INTERFACE 44 |
| NODE 8 IP ADDRESS | INTERFACE 44 |

FIG. 15

| NODE IDENTIFIER | SESSION IDENTIFIER |
|---|---|
| NODE 1 @abc.com | 101 |
| NODE 2 @abc.com | 102 |
| NODE 5 @abc.com | 105 |
| NODE 6 @abc.com | 106 |

FIG. 16

| NODE IDENTIFIER | SESSION IDENTIFIER |
|---|---|
| NODE 3 @xyz.com | 203 |
| NODE 4 @xyz.com | 204 |
| NODE 7 @xyz.com | 205 |
| NODE 8 @xyz.com | 206 |

VRRP TECHNOLOGY KEEPING VR CONFIDENTIALITY

BACKGROUND OF THE INVENTION

The present invention relates to a packet transmission router to be used for a VRRP (Virtual Router Redundancy Protocol) network having a VR (Virtual Router) function.

The VRRP is the technology for improving the reliability of the packet transmission router used in the network. In the VRRP, a packet transmission router is physically composed of a plurality of packet transmission routers for redundancy so that even if a single one of those routers fails, the other ones can take over the process from the damaged router to keep the operation of the whole packet transmission router not stopped. The router that is now processing packets is called the active packet transmission router, and the spare router that operates when the active router fails is called the standby packet transmission router.

Figure 1:
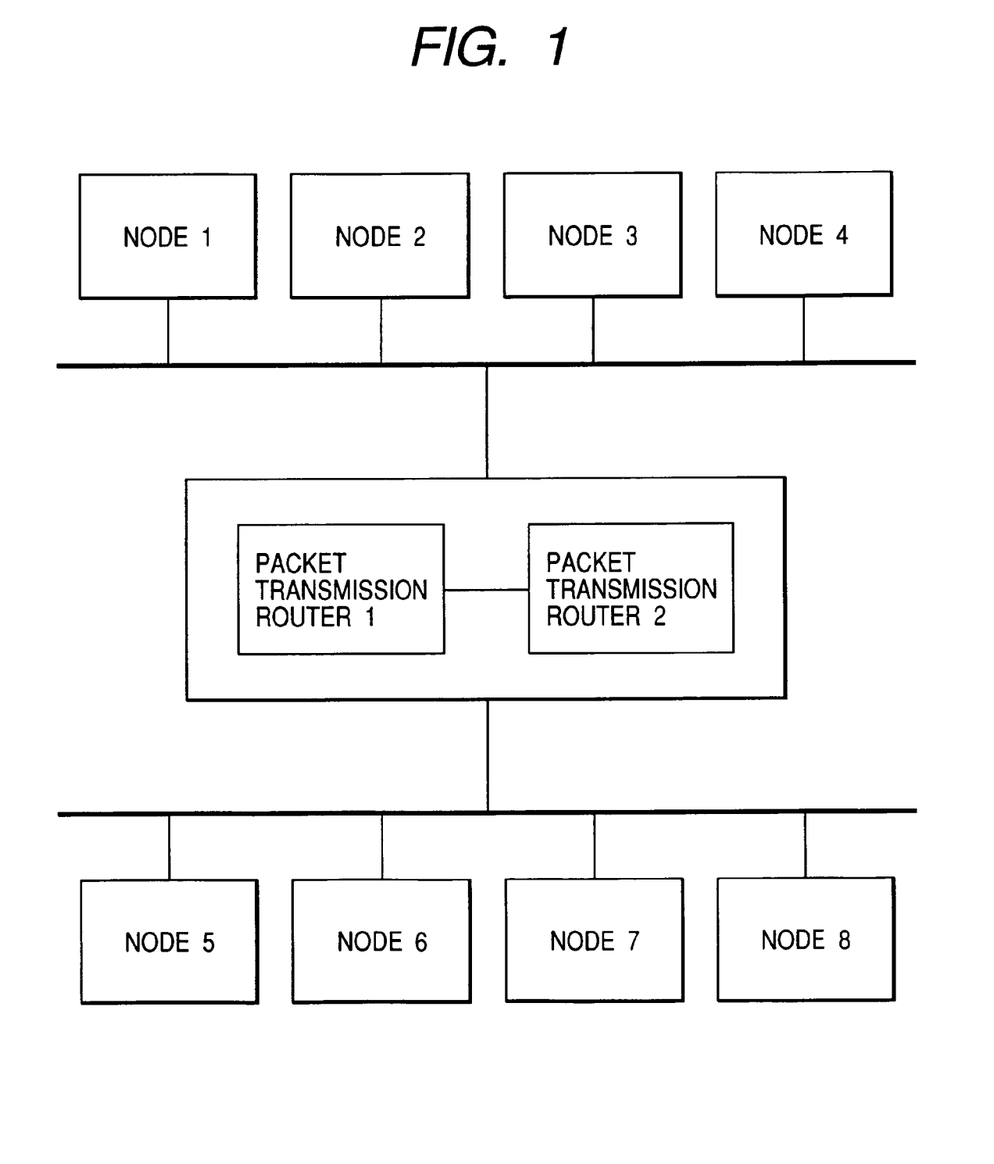
FIG. 1 is a diagram showing the arrangement of a conventional redundancy packet transmission router within a network.

FIG. 1 shows an example of the packet transmission router having the VRRP function incorporated. As illustrated in FIG. 1, the nodes 1~8 provided on the network are connected through the packet transmission routers (that is, packet transmission routers 1, 2). The packet transmission router 1 serves as the active packet transmission router, and the packet transmission router 2 as the standby packet transmission router. The packet transmission routers are numbered 1, 2 as identifiers (VRID), respectively. Each of the nodes recognizes the packet transmission router 1 as the active packet transmission router so that data can be always transmitted to the packet transmission router 1. The packet transmission router 1 as the active packet transmission router generates a VRRP packet so that the VRRP packet can be periodically transmitted to the packet transmission router 2, or the standby packet transmission router. The packet transmission router 2 confirms from the VRRP packet that there is the packet transmission router 1 and that the VRID is 1.

If the router 1 goes down due to any disorder, the router 2 that consequentially cannot receive the periodical VRRP packet recognizes that there is no longer the router 1, and changes its own IP address and MAC address to those of router 1. Therefore, even if the router 1 fails, the router 2 takes over the IP address and MAC address of the router 1, and thus data can be continuously transferred to be seamless with ARP (Address Resolution Protocol) table not restructured.

Figure 2:
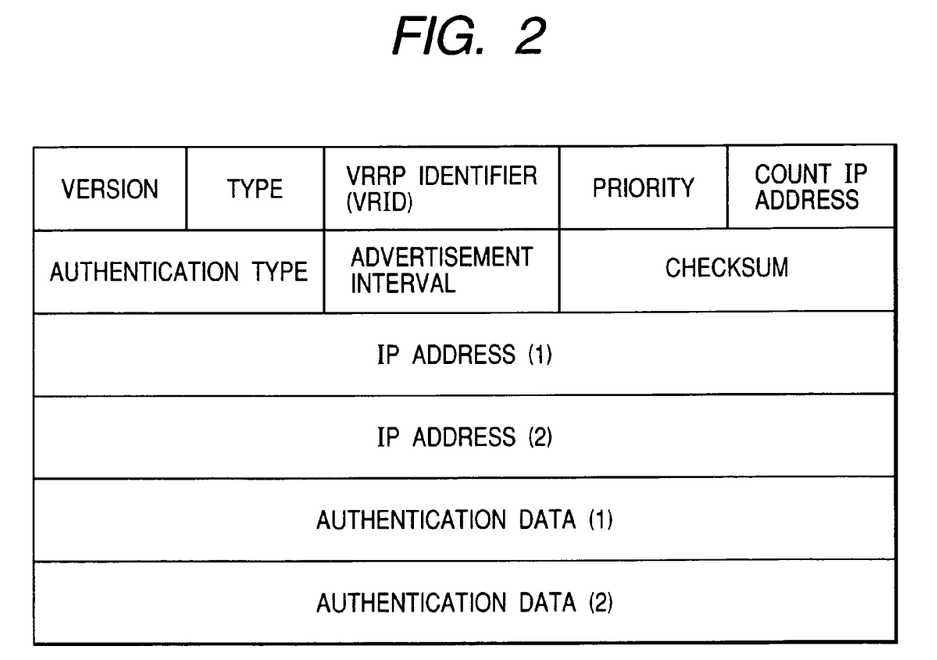
FIG. 2 is a diagram showing the format of a conventional VRRP packet.

FIG. 2 shows the format of the VRRP packet. Referring to FIG. 2, the version of VRRP is stored in the "VERSION" field. 1 is stored in the "TYPE" field. All packets having any number except 1 are discarded. The VRID value is stored in the "VRRP IDENTIFIER" field. The VRID enables the active and standby packet transmission routers to identify the relationship between themselves. A value of 0~255 is stored in the "PRIORITY" so that the routers that transmit packets of larger priority values can be selected as active routers. A value of 0~255 is stored in the "ADVERTISEMENT INTERVAL", making it possible to specify the transmission interval of VRRP packets. In the "IP ADDRESS" is stored the IP address of the active router, or the IP address shared on the VRRP network. The VRRP packet generated is capsulated with a data link header and IP header and transferred.

There is another technology called VR (Virtual Router) that logically builds up a function to serve as a plurality of packet transmission routers on a single packet router. The term VR is the technology in which the presence of a plurality of packet transmission routers is emulated on a certain physical packet transmission router on a software basis. The virtual packet transmission routers thus emulated are called VR (Virtual Router). The VR is regarded as an elemental technology that is important to realize virtual closed networks on the Internet.

Figure 3:
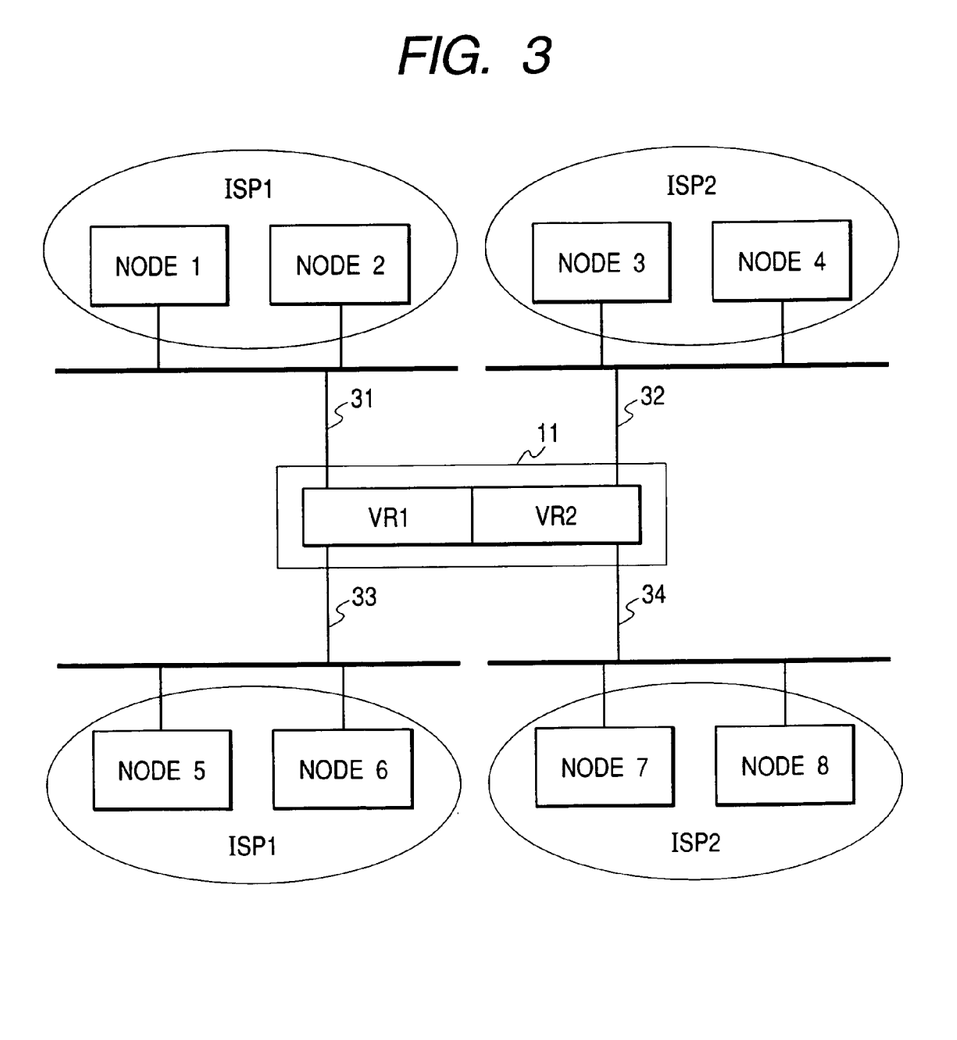
FIG. 3 is a conceptual diagram of virtual routers.

FIG. 3 is a conceptual diagram of the virtual router. A packet transmission router 11 shown in FIG. 3 is physically a single router, but has two routers VR 1, VR 2 on a software basis. As illustrated in FIG. 3, the packet transmission router 11 in which the virtual routers VR 1, VR 2 operate is connected to ISP (Internet Service Provider) 1 and ISP 2 so that packets between ISP1 networks can be transmitted and received through VR1 and packets between ISP2 networks can be transmitted and received through VR2. The virtual routers VR 1, VR 2 respectively manage their own routing tables associated with ISP 1, ISP 2. For example, only information within provider ISP 1 is stored in the routing table that router VR 1 manages so that the network interface to transmit to can be discriminated by referring to the destination address of the received packet. In most cases, in order to economize the memory space for storing the routing tables, a single routing table is actually shared by the routers VR 1, VR 2, but the routers VR 1, VR 2 respectively manage only entry tables for reference to the routing table. The packet sent to node 1 is transmitted through a network interface 31. Therefore, even if the nodes 1, 3 had the same IP address, information to be sent to node 1 could not be transmitted through a network interface 32 or information to be sent to node 3 could not be transmitted through the network interface 31.

SUMMARY OF THE INVENTION

When an end user has access to the Internet, a communication network called access network is used between the end user and the Internet. This communication network connects the subscribers to the Internet service providers (ISP). The packet transmission router located at the ends of the access network is required to have the ability to accommodate a large number of users and the accuracy with which the received packets can be correctly transferred to the corresponding ISP. The virtual router can manage the routing table for each ISP and thus it is suitable for the packet transmission router used in the access network.

The packet transmission router used in the access network is also required to have the reliability of keeping the connection to the user terminals even if any trouble occurs. Thus, it can be considered that VRRP is applied to the packet transmission router that is activating the VR function, thereby improving the reliability. However, if VRRP is simply applied to the virtual router VR, it will be supposed that information about the routing table that each VR manages could leak out. The leakage of information will be further described in detail below.

Figure 4:
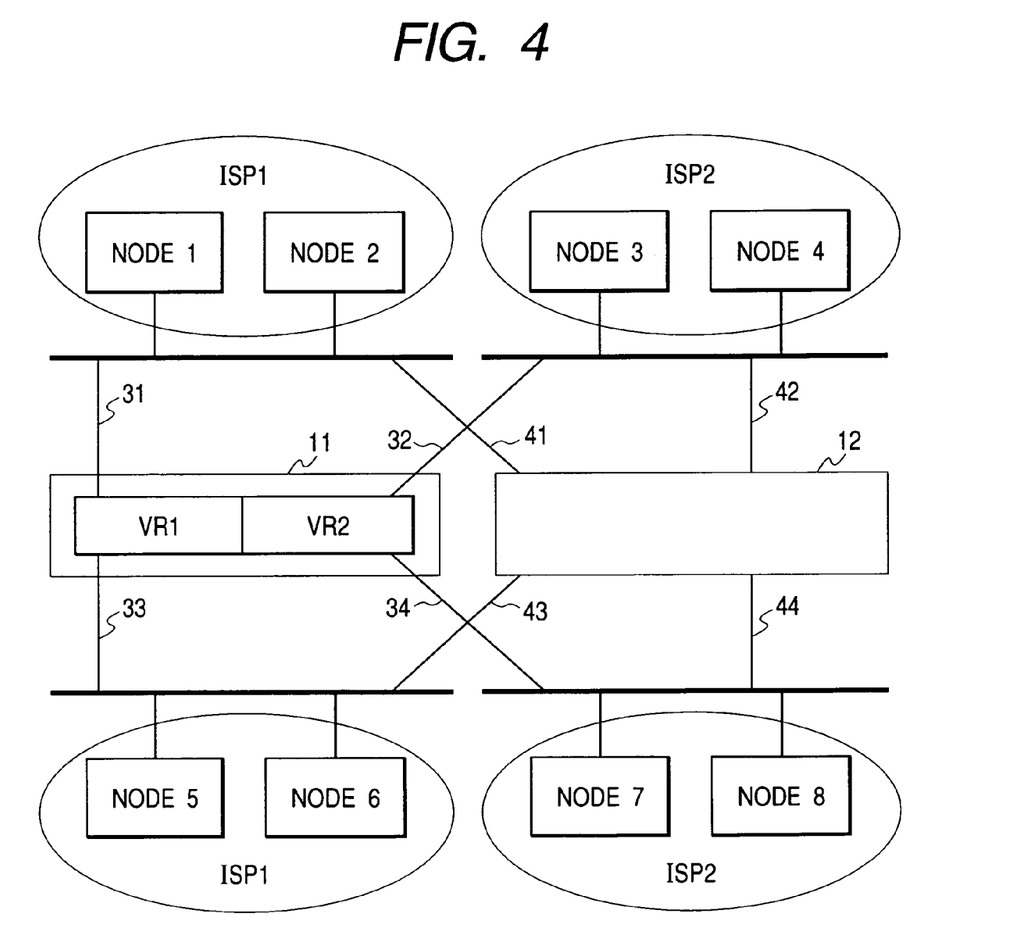
FIG. 4 is a diagram to which reference is made in explaining a problem occurring when the conventional redundancy router starts to make its VR operate.

FIG. 4 shows the situations in which the active packet transmission router has its VR activated but the standby packet transmission router has its VR not activated. Reference numeral 11 represents the active packet transmission router, and 12 the standby packet transmission router. The active router 11 has VR 1 and VR 2 activated. The virtual router VR 1 built in the active router 11 manages only the packets transmitted to or received from ISP 1, and transmits packets to nodes 1, 2 through interface 31 and to nodes 5, 6 through interface 33. Similarly, the virtual router VR 2 manages only the packets transmitted to or received from ISP 2, and transmits packets to nodes 3, 4 through interface 32 and to nodes 7, 8 through interface 34.

Under this condition, if a trouble occurs on the router 11, the router 12 will be activated under VRRP to take over the process. Under the present circumstances, however, there is no means by which the route information that the active router has so far managed is classified depending on VR 1, VR 2 and transferred to the standby router 12. In other words, data of the routing table that the VR 1 manages and data of the routing table that the VR 2 manages are not distinguished when they are transferred to the router 12.

Figure 5:
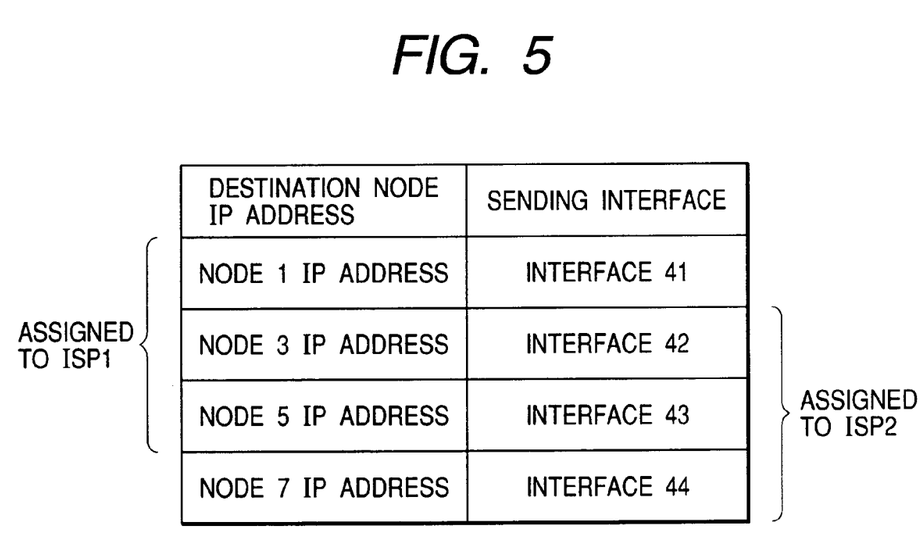
FIG. 5 is a diagram showing the routing table generated when the conventional router makes the VR operate.

FIG. 5 shows the routing table that the standby router 12 generated on the basis of the route information transferred from the active router 11 under the condition that the conventional VRRP is applied to VR. From FIG. 5, it will be seen that the IP addresses of nodes assigned to ISP 1 and the IP addresses of nodes assigned to ISP 2 are mixed in the same routing table, or that information of ISP 1 and information of ISP 2 are mixed in the same routing table. This means that the classified information of each ISP is lost.

In addition, when each ISP uses the same IP address system, the routing table includes duplicate information, and as a result information to flow to ISP 1 could flow to ISP 2. If the nodes 1, 3 use the same IP address, the standby router 12 cannot decide whether the packet to go to the IP address of node 1 is to be transmitted through network interface 41 or through network interface 42. In order to avoid the above problem under this VRRP, it is necessary that the same VR as in the active router be also provided in the standby router.

The packet transmission router or packet exchange of the invention, when the route information or route control information is transferred from the active router to the standby router, also transmits the information that indicates which virtual router manages the route information, thus solving the above problem.

According to the packet transmission router of the invention, when a trouble occurs on the active router having its VR function activated and when the data processing is shifted to the standby router by VRRP, the confidentiality of VR established by the active router can be maintained while the data processing is taken over by the standby router. Therefore, the user can always continuously transmit data to the same IP address without being aware of the trouble on the active router.

Other objects, features and advantages of the invention will become apparent from the following description of the embodiments of the invention taken in conjunction with the accompanying drawings.

DESCRIPTION OF THE EMBODIMENTS

Embodiment 1

Figure 6:
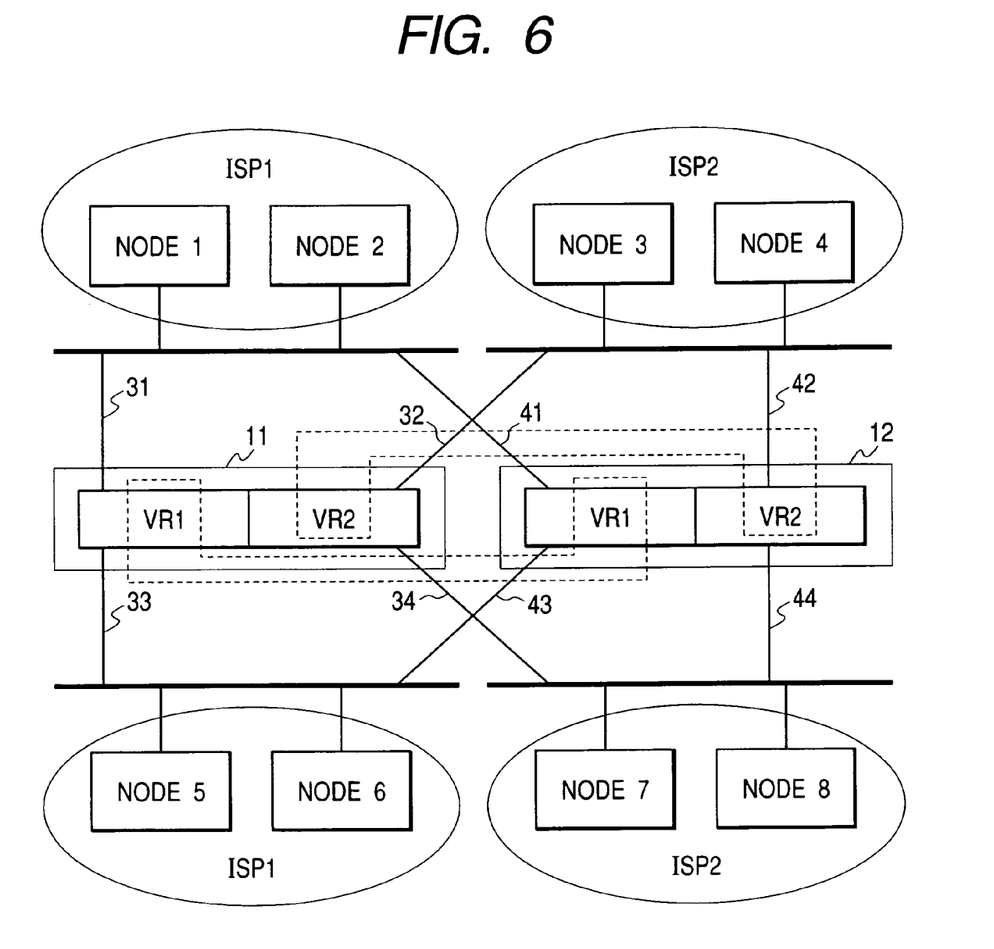
FIG. 6 is a diagram showing a redundancy packet transmission router of this invention and a network in which this router is arranged.

FIG. 6 shows the situation in which an embodiment of the invention, or a redundancy packet transmission router with a VR function incorporated is actually provided on the network. The redundancy packet transmission router of this embodiment includes the active packet transmission router 11 and the standby packet transmission router 12 each of which has virtual routers VR 1, VR 2 activated. When the virtual routers of the standby router 12 are not operated, the active router 11 sends a VR boot order as a trigger to the standby router 12, causing its virtual routers VR to operate. The active router 11 has a plurality of communication ports of which certain ones are assigned to interfaces 31, 33 for ISP 1 and of which the other ones are assigned to interfaces 32, 34 for ISP 2. In FIG. 6, VR 1 manages the transmission and reception of packets to ISP 1, and VR 2 does the transmission and reception of packets to ISP 2. Similarly, the standby router 12 has a plurality of communication ports of which certain ones are assigned to interfaces 41, 43 for ISP 1, and of which the other ones are assigned to interfaces 42, 44 for ISP 2. That is, VR 1 manages the transmission and reception of packets to ISP 1, and VR 2 does the transmission and reception of packets to ISP 2.

Figure 7:
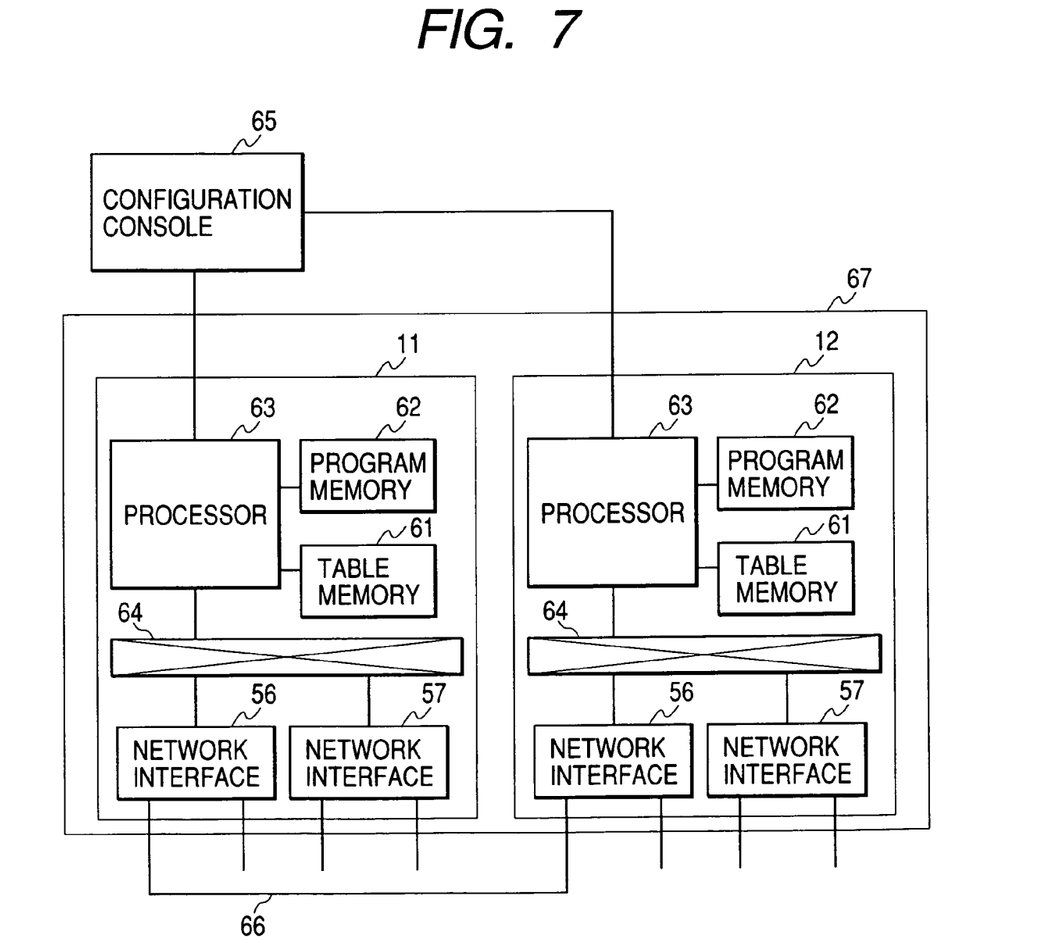
FIG. 7 is a diagram showing the hardware structure of the redundancy packet transmission router of this invention.

FIG. 7 shows the hardware structure of the redundancy packet transmission router of this embodiment. Reference numeral 11 designates the active packet transmission router, and 12 the standby packet transmission router. The active router 11 and the standby router 12 are connected to each other through a communication channel 66 that is connected to network interfaces 56 of the active and standby routers. In a program memory 62 of each router is stored the software of the procedure for processing data. In a table memory 61 of each router is stored route information for received packets, for example, a table of IP addresses of destination nodes and associated sending interfaces. When the packet transmission router is started to operate, the information of program memory 62 and table memory 61 is sent to a processor 63. When a packet actually arrives at a network interface, the processor 63 orders a switch 64 to operate, transferring it to a desired destination. The packet transmission router is connected to a configuration console 65. The configuration console 65 has input means such as a personal computer connected so that the packet transmission router can be set for various modes by entering control commands.

The redundancy packet transmission router shown in FIG. 7 has two routers provided within a single housing 67, but the packet transmission routers physically located in distant places may be connected by a network to form VRRP as described above. When the two routers are placed within a single housing, those routers may be connected not through the network I/F, but directly by a VRRP packet transfer dedicated line between switches 64. In this case, the VRRP packet and route control information can be transferred without interfering with the transmission and reception of incoming and outgoing data packets through network interfaces.

Figure 8:
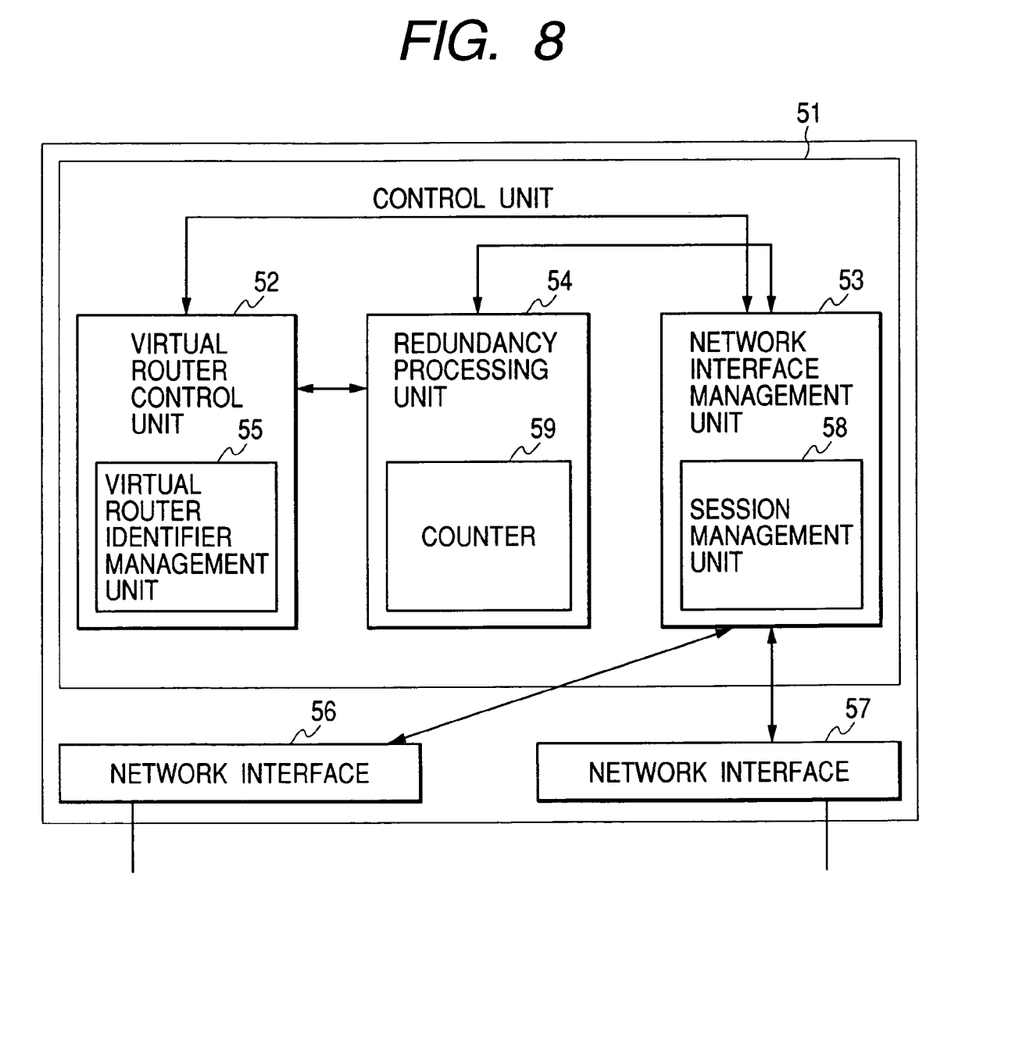
FIG. 8 is a diagram showing the software structure of the packet transmission router of this invention.

FIG. 8 shows the software structure of the packet transmission router. In this figure, the entire software structure is represented as a control unit 51. A redundancy-processing unit 54 periodically transmits the VRRP packet if it is provided within the active router, or receives the VRRP packet periodically sent if it is provided within the standby router. The redundancy-processing unit 54 includes a counter 59. If this packet transmission router is the standby router, this counter checks to see if the VRRP packet is periodically transmitted. A virtual router control unit 52 manages the status of the VR of this router. When this router is used as a plurality of logical routers, each VR independently manages instructions given to it. VR identifiers are provided to identify the virtual routers VR, respectively. A virtual router identifier management unit 55 provided within the virtual router control unit 52 holds values of all the VR identifiers. The virtual router control unit 52 controls each VR with the VR identifiers used as parameters.

In this invention, a function to avoid a trouble in each VR is achieved by synchronizing the VRID within the VRRP packet used in the redundancy-processing unit 54 with the VR identifiers that the virtual router identifier management unit 55 manages. A network interface management unit 53 manages information peculiar to the network interfaces 56, 57 such as IP addresses of network interfaces. A session management unit 58 manages session information. The network interface management unit 53 and the session management unit 58 work with the redundancy processing unit 54 and the virtual router control unit 52, and grasp which VR is assigned to each network interface and from which network interface the VRRP packet is transmitted or received. The respective function blocks shown in FIG. 8 are actually turned into reality when the processor 63 shown in FIG. 7 executes the program read out from the program memory 61.

The VRRP dynamically selects a single packet transmission router as the active router from a plurality of packet transmission routers provided within the redundancy packet transmission router. The routers not selected serve as the standby routers. The standby routers communicate with the active router to receive or transmit the VRRP packet having information such as VR identifiers and IP addresses, and synchronize the route control information of the standby router with that of the active router. The packet transmission routers having the VRRP formed can be selected not only as the routers provided in the redundancy packet transmission router but also as the physically separated routers connected through a network. A single router may be provided that serves as a plurality of active/standby routers.

The redundancy packet transmission router of this embodiment shown in FIG. 6 includes two packet transmission routers, but it is possible to construct a large-scale redundancy packet transmission router that includes three or more packet transmission routers. At this time, the active router 11 makes multicast transmission of VRRP packet to the other standby routers. In that case, the active router generates the VRRP packet with the destination address provided as a multicast address.

Figure 9:
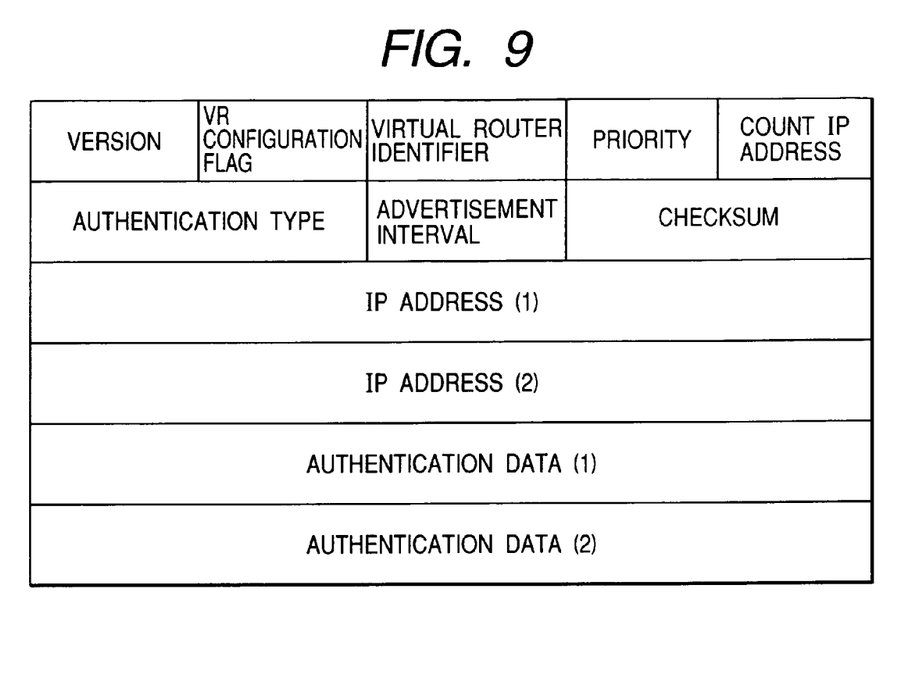
FIG. 9 is a diagram showing the format of the VRRP packet generated by the redundancy packet transmission router of this invention.

FIG. 9 shows the format of the VRRP packet in this embodiment. This format is different from the conventional format shown in FIG. 2 in that a VR configuration flag indicative of how to process in order to control VR is provided in place of the type field and that a VR identifier to distinguish between virtual routers is stored in the VRID field. The VR identifiers are stored in the VRID field. The VR identifiers may be values themselves of VR identifiers for distinguishing between the virtual routers or other values uniquely derived from the VR identifiers. The maximum amount of data that can be stored in the VR identifier field within the VRRP packet is 8 bits, or values of 0~250. The user can freely set the contents of the VR configuration flag and the values of the VR identifier through the configuration console 65.

The standby router, when receiving the VRRP packet from the active router, refers to the VR configuration flag to decide that this packet has been transmitted from the active router in which the virtual routers are active. In addition, the standby router knows, from the VR identifier of this packet, which VR has sent this VRRP. The standby router also recognizes that the VRRP packet having the same value as this VR identifier is information from this VR, and later treats such packet so that it can be distinguished from the information that the other VR will send.

In the "ADVERTISEMENT INTERVAL" field is stored a value of interval at which the active router sends the VRRP packet to the standby router. The active router transmits the VRRP advertisement packet at the advertisement interval to inform the standby router of its existence. The standby router measures the difference between the current time and the time when the VRRP packet was received by using the counter, and then compares it with the value of the advertisement interval stored in the received packet. If the active router fails due to any trouble so that the standby router cannot periodically receive the advertisement packet, the standby router starts to take over the operation of the active router.

Figure 10:
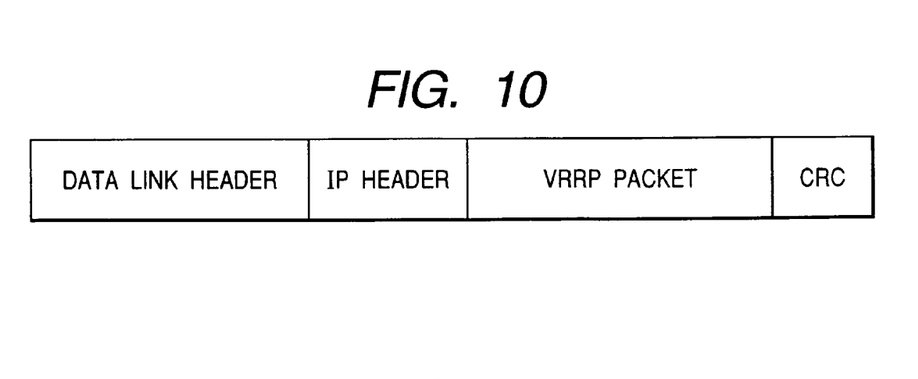
FIG. 10 is a diagram showing the format of a packet formed when the VRRP packet generated by the redundancy packet transmission router of this invention is capsulated with a data link header and IP header.
Figure 11:
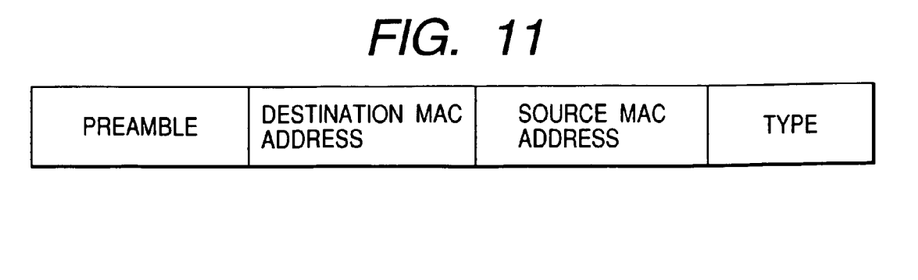
FIG. 11 is a diagram showing the format of the data link header for the capsulation of the VRRP packet generated by the redundancy packet transmission router of this invention.

When the VRRP packet is transmitted, it is actually capsulated with a data link header and IP header before being transferred. FIG. 10 shows the format of the capsulated VRRP packet. FIG. 11 shows the format of the data link header for the capsulation. A multicast MAC address for VRRP, 01-00-5E-00-00-12 is written in the destination MAC address. In the source MAC address is stored an address that is generated by a MAC address generation rule. If the VR identifier is 1, a value of 00-00-5E-00-01-01 is stored.

Figure 12:
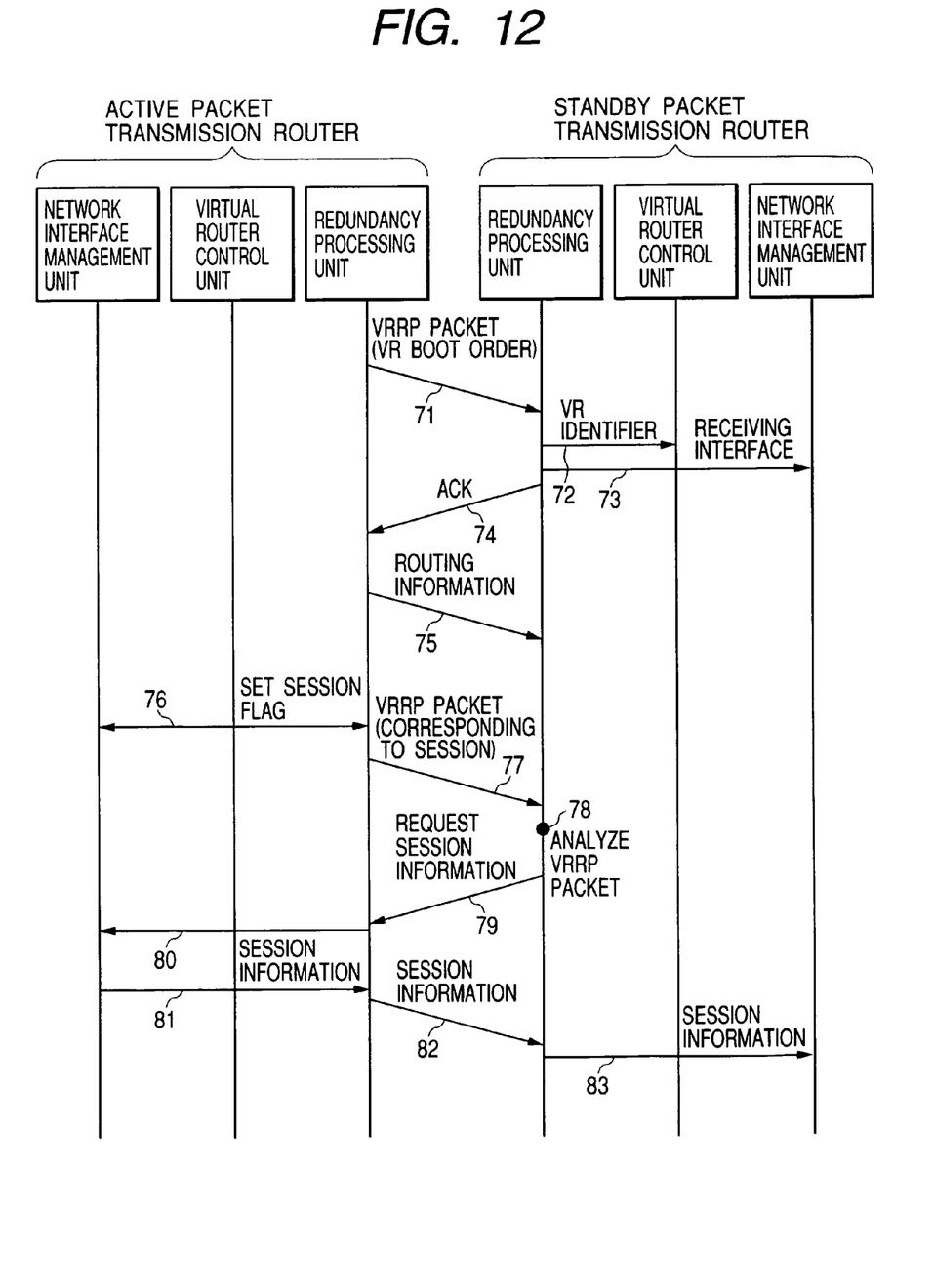
FIG. 12 is a diagram showing the sequence of the operation of the redundancy packet transmission router of this invention.

Now, let it be described how the standby router 12 with the VR usually not operated operates when it receives the VRRP packet with reference to FIGS. 6 and 12. In FIG. 6, it is assumed that all the VRRP packets sent from the network interface assigned to the VR 1 of the active router 11 have the VR boot order written as the VR configuration flag and a value of 1 filled in the VR identifier field. In other words, the VRRP packets flowing through the network interfaces 31, 33, 41 and 43 have a VR identifier of 1. The VRRP packets are transmitted through the network interface 31, then 41 to the router 12 or through the network interface 33, then 43 to the router 12.

Similarly, it is assumed that the VRRP packets sent from the network interface assigned to VR 2 have the VR boot order written as the VR configuration flag and a value of 2 written in the VR identifier field. In other words, the VRRP packets flowing through the network interfaces 32, 34, 42 and 44 all have a VR identifier of 2. The VRRP packets are transmitted through the network interface 32, then 42 to the router 12 or through the network interface 34, then 44 to the router 12. The router 12, when receiving the VRRP packet, first analyzes the VRRP packet. It first refers to the VR configuration flag. When the VR boot order flag rises, the router 12 knows that this packet has been sent from the active router with VR activated, and orders its VR to operate.

Then, when router 12 refers to the VR identifier and detects 1, it creates VR 1. Then, it produces a new routing table about the information received from the network interfaces 41, 43 that have received the packets of VR identifier 1 and manages the table independently of other information. When the VRRP packet has the VR boot order flag raised and VRID of 2 written, the router 12 creates VR 2. Then, it produces a new routing table about the information received from the network interfaces 42, 44 that have received the packets of VR identifier 2, and manages the table independently of other information.

FIG. 12 shows the sequence of the operation of the standby router 12 that has received the VRRP packet having the VR boot order flag raised in the VR configuration flag field. Referring to FIG. 12, when the VRRP packet is received through the network interface, it is transferred to the redundancy-processing unit (71) where it is analyzed. When the VR boot order flag is raised in the VR configuration flag field, the VR identifier stored in the VRRP packet and the information about the interface that has received this packet are respectively transferred to the virtual router identifier management unit (72) and network interface management unit (73). The virtual router identifier management unit, after acquiring the VR identifier, transmits it as an argument to the virtual router control unit, thus creating a VR. The network interface management unit that has acquired the information about the interface that received the VRRP packet recognizes that this interface corresponds to the VR.

When the processing up to this recognition is finished, the standby router 12 sends ACK to the active router 11 (74). The active router 11, when receiving ACK from the standby router 12, starts to transfer the routing information to the standby router 12 (75). The routing information has the VR identifier added before being sent. The standby router 12 updates its own routing table on the basis of the transmitted routing information. The virtual router VR 1, VR 2 independently manages the update operation.

Figure 13:
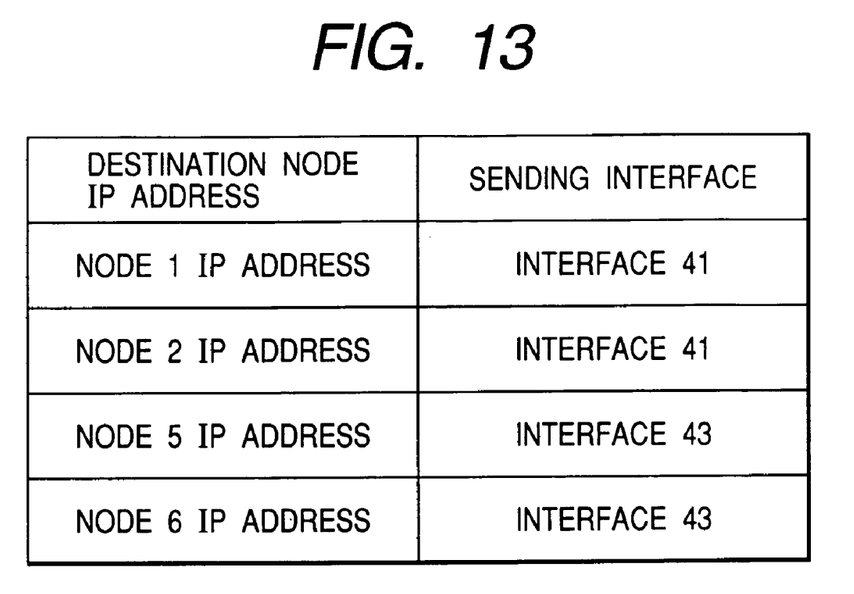
FIG. 13 is a diagram showing a routing table managed by the VR 1 of the redundancy packet transmission router of this invention.
Figure 14:
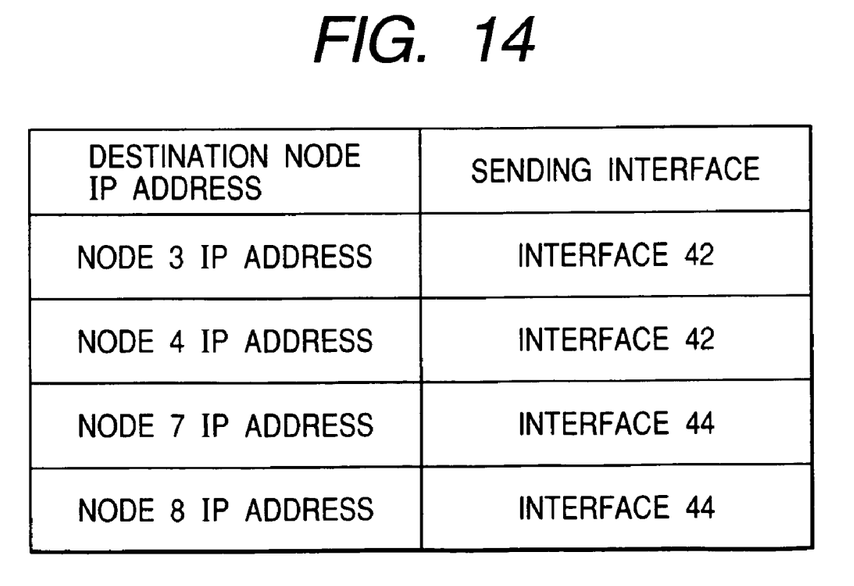
FIG. 14 is a diagram showing a routing table managed by the VR 2 of the redundancy packet transmission router of this invention.

FIGS. 13 and 14 show the routing tables of VR1, VR2 that are generated on the standby router after the virtual router function is started by the VR boot order. FIG. 13 shows the routing table of VR 1 produced when the VR identifier of 1 is received. This table describes only the information transmitted from the network interfaces that have received the VRRP packet of VR identifier 1. In other words, it includes only the data sent from the VR 1 of the active router. FIG. 14 shows the routing table of VR 2 produced when the VR identifier 2 is received. This table describes only the information sent from the network interfaces that have received the VRRP packets of VR identifier 2. In other words, the table includes only the data transmitted from the VR 2 of the active router. Thus, the standby router can also have built therein the same VR environment as the active router. The information of each VR is not mixed with other VR information during the data communication.

Thus, the standby router, even if it is not previously set for VR, can dynamically set its VR according to the VRRP packets from the active router. In addition, the standby router can independently manage each routing table so that the confidentiality of each VR can be assured. Therefore, even if the destination of data from the user is changed from the active router to the standby router, this data is not leaked into other VR, but can be transferred through the standby router.

Embodiment 2

In some case, a session is provided between the active router and a node. The term session stands for one-to-one connection generated between a router and a node by a protocol such as PPP (Point to Point Protocol). In the case of a session communication, each session incidentally generates a data transmission parameter acquired by the negotiation between the active router and a node. The parameters generated are, for example, transaction information such as password and amount of money that the user enters in e-commerce or a data group that describes the association between the identifiers (session identifiers) that the router uniquely assigns to each node in order to manage it and the identifiers (node ID) peculiar to nodes that are determined by an external organization. In this embodiment, this information is called session information.

Figure 15:
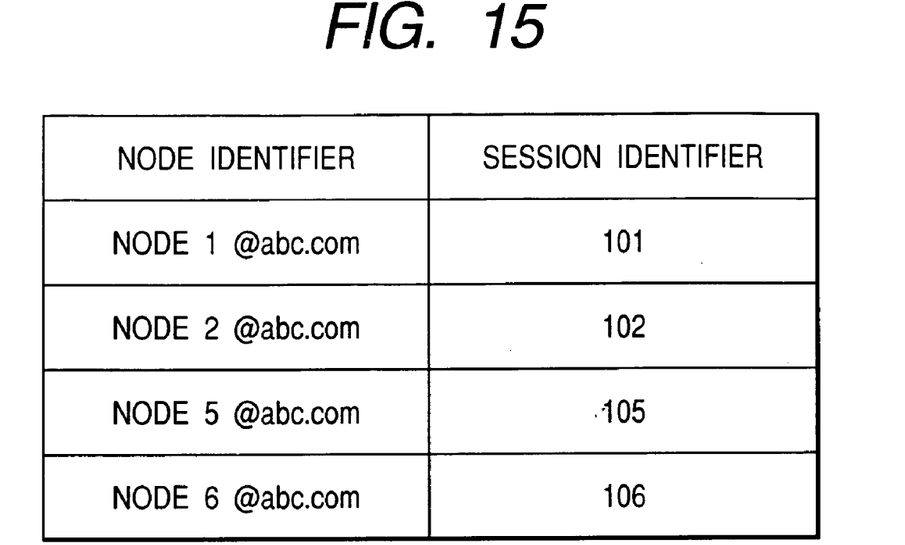
FIG. 15 is a diagram showing a session information management table managed by the VR 1 of the redundancy packet transmission router of this invention.
Figure 16:
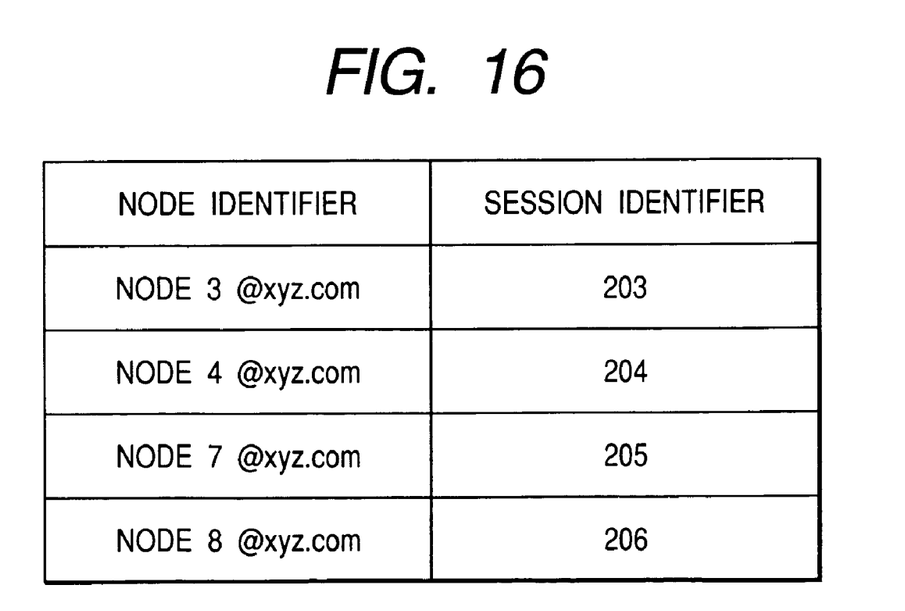
FIG. 16 is a diagram showing a session information management table managed by the VR 2 of the redundancy packet transmission router of this invention.

Referring to FIG. 6, when a session is set up between the node 1 and the VR 1 of the router 11, negotiation for a plurality of parameters is performed between the node 1 and VR 1. The VR 1 of the router 11 manages the information about the negotiation. FIG. 15 shows a session information management table managed by VR 1. This table is stored in the table memory 61 of FIG. 7 in a form of data table. The session information of FIG. 15 includes only the information that the ISP 1 has, and is given as a table of node ID and session identifier associated with each other. In FIG. 15, it will be seen that, for example, node 1 @abc.com corresponds to session identifier 101. The session information management table of FIG. 16 describes only the information that the ISP 2 has. In FIG. 16, it will be seen that, for example, node 3 @xyz.com corresponds to session identifier 203. Each session information management table is independently managed.

Thus, if the same session identifier is assigned to node 1 @abc.com and node 3 @xyz.com, there occurs no mixture of session information that VR1 and VR 2 manage. If it is necessary to manage statistics information and authentication information for each session in addition to the node ID and session identifier, this information is read from or written in a storage sever that is provided in a place different from the active router.

When a session is set up only in the active router, and when a trouble occurs on the active router, the restoration cannot be done because the standby router does not hold the session information acquired by the active router. Therefore, in order to take over the session processing that the active router makes, it is necessary that the session information held by the active router be transmitted to the standby router.

This case can also be treated well by using the VR configuration flag of VRRP packet as is similar to the method in which the VR is autonomously started to operate. The session management between the redundancy packet transmission router of this embodiment and the surrounding nodes will be described with reference to FIGS. 6 and 8.

When the virtual routers VR of the active router are operating, and when a session is set up within the VR, the virtual router control unit 52 and session management unit 58 shown in FIG. 8 order the redundancy processing unit 54 to raise the VR boot order flag and session execution flag in the VR configuration flag field of the VRRP packet. In FIG. 8, the VR 1 of router 11 transfers the VRRP packet with the above flags raised to the standby router 12. When the router 12 receives this packet, the redundancy-processing unit 54 shown in FIG.

8 analyzes the VR configuration flag field of the VRRP packet. This analysis enables the router 12 to know that the router 11 has its VR operated and that the session is set up. The router 12 knowing that the router 11 has VR operated causes its VR 1 to operate, and processes the information later received from the interfaces 41, 43 with the confidentiality maintained.

In addition, the standby router 12 requests the router 11 to transfer the session information that the router 11 manages. The session management unit 58 of the router 11 that has received the session information transfer request transmits the session information decided between the router 11 and each node, or the information shown in FIG. 15 to the router 12 through the network interfaces 41, 43. The session management unit 58 of the router 12 that has received the session information acquires the session information that the router 11 manages. When a trouble occurs on the router 11, the router 12 takes over the processing of the data transferred from each node on the basis of the acquired session information. Since the router 12 takes over the processing from the router 11, each node can make communication of data through the session without being aware of the trouble in the active router.

FIG. 12 shows the flow of this processing. The network interface management unit, when a session is incorporated in a certain network interface, orders the redundancy processing unit to raise the session execution flag in the VR configuration flag field of the VRRP packet produced from this network interface (76). The redundancy-processing unit of the active router transmits the VRRP packet having the session execution flag raised in the VR configuration flag field to the standby router (77). The standby router 12, when receiving the VRRP packet from the active router 11, analyzes the VRRP packet (78). When the session execution flag is raised in the VR configuration flag field of the VRRP packet, the standby router 12 knows that this packet has been sent from the active router 11 that makes the session processing, and requests the active router 11 to transfer the session information (79).

The active router 11 that has received the session information transfer request transfers the managed session information to the standby router 12 (82). The standby router 12 that has received the session information transfers this information to the session management unit provided within the network interface management unit (83). The session management unit sets up this information for each VR. Thus, the session information can be synchronized between the active router and the standby router so that the standby router can instantaneously take over the session information management even if a trouble occurs on the active router.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A redundancy packet transmission system, comprising: an active router and a standby router each of which has at least first and second virtual routers logically realized therein, and an internal wiring conductor to connect between said active router and said standby router,
    wherein said first virtual router of the active router is configured to transmit packets only with a first internet service provider and said second virtual router of the active router is configured to transmit packets only with a second internet service provider,
    each of said active router and said standby router includes:
    a network interface for transmitting packets;
    a processor for processing the packets transmitted from and to the internet service providers;
    a table memory for storing routing information of said first internet service provider necessary for routing packets from said first internet service provider only via said first virtual router logically realized in the active or standby router and for storing routing information of said second internet service provider necessary for routing packets from said second internet service provider only via said second virtual router logically realized in the active or standby router; and
    a program memory for storing in advance a program to be executed by said processor provided in the active or standby router,
    wherein when said active router operates normally, said at least first and second virtual routers logically realized on said active router are activated and said at least first and second virtual routers logically realized on said standby router are not activated,
    said respective routing information of said first or second internet service provider stored in the table memory of the active router is independently managed by only the first or second virtual router logically realized in said active router, and said respective routing information of said first or second internet service provider stored in the table memory of the standby router is independently managed by only a first or second virtual router logically realized in said standby router,
    wherein when said active router has a trouble that occurs therein, said processor provided in said active router independently synchronizes (1) said routing information of said first internet service provider managed by the first virtual router of the active router with routing information to be managed by the first virtual routers of said standby router, and (2) said routing information of said second internet service provider managed by the second virtual router of the active router with routing information to be managed by the second virtual routers of said standby router, by:
    transmitting through the internal wiring conductor from said active router to said standby router a packet including a virtual router configuration flag and identification information of said first or second virtual router logically realized in said active router,
    receiving a response signal relative to said identification information from said first or second virtual router logically realized in said standby router, and
    transmitting and storing said routing information of said first and second internet service providers from said active router to said standby router, wherein the transmitting and storing are done independently without mixing said routing information of said first and second internet service providers.

2. A redundancy packet transmission system according to claim 1, wherein said virtual router configuration flag indicates whether to activate said first and second virtual routers logically realized in said standby router.

3. A redundancy packet transmission system according to claim 2, wherein said packet including said virtual router configuration flag and said identification information of said first and second virtual routers logically realized in said active router is a Virtual Router Redundancy Protocol (VRRP) packet.

4. A redundancy packet transmission system according to claim 3, wherein said virtual router configuration flag indicating whether to activate said first and second virtual routers logically realized in said standby router is stored in a type field of said VRRP packet.

5. A redundancy packet transmission system according to claim 2, further comprising a configuration console that has a display screen and command input means, wherein said virtual router configuration flag indicating whether to activate said first and second virtual routers logically realized in said standby router is determined on the basis of a command entered through said command input means.

6. A redundancy packet transmission system according to claim 1, wherein said standby router updates said routing information of said first and second internet service providers managed by said first and second virtual routers logically realized in said standby router on the basis of said routing information of said internet service providers sent from said active router via separated packets.

7. A redundancy packet transmission system according to claim 1, wherein said active router periodically transmits said packet including said identification information of said first and second virtual routers logically realized in said active router to said standby router.

8. A redundancy packet transmission system according to claim 7, wherein said standby router has a counter, and
when said standby router does not receive said packet including said virtual router configuration flag and said identification information for a predetermined time, said standby router determines by using the counter that at least one of said first and second virtual routers logically realized in said active router has failed, and then starts to take over processing being handled by said first and second virtual routers logically realized in said active router.

9. A redundancy packet transmission system according to claim 1, wherein said packet including said virtual router configuration flag and said identification information of said first and second virtual routers logically realized in said active router is a Virtual Router Redundancy Protocol (VRRP) packet.

10. A redundancy packet transmission system according to claim 9, wherein said identification information of said first and second virtual routers logically realized in said active router is recorded in a Virtual Router identifier (VRID) field of said VRRP packet.

11. A redundancy packet transmission system according to claim 1, wherein the internal wiring conductor is a communication channel that is connected to said network interface of each of the active and standby routers.

12. A redundancy packet transmission system according to claim 1, wherein each of said active router and said standby router further includes a switch, and
the internal wiring conductor is a VRRP packet transfer dedicated line connecting between said switch of each of the active and standby routers.

* * * * *